US006182531B1

(12) United States Patent
Gallagher et al.

(10) Patent No.: US 6,182,531 B1
(45) Date of Patent: Feb. 6, 2001

(54) CONTAINMENT RING FOR FLYWHEEL FAILURE

(75) Inventors: Patrick Gallagher, Bainbridge Island; Jonathan W. Gabrys, Kent, both of WA (US)

(73) Assignee: The Boeing Company, Seattle, WA (US)

( * ) Notice: Under 35 U.S.C. 154(b), the term of this patent shall be extended for 0 days.

(21) Appl. No.: 09/096,770

(22) Filed: Jun. 12, 1998

(51) Int. Cl.$^7$ .................................................. G05G 1/00
(52) U.S. Cl. .............................. 74/572; 74/608; 74/609; 464/101
(58) Field of Search ............................. 74/572–574, 608, 74/609; 464/101; 192/208, 70.17

(56) References Cited

U.S. PATENT DOCUMENTS

| | | |
|---|---|---|
| 1,698,514 | 1/1929 | Schmidt . |
| 3,534,807 * | 10/1970 | Bracken .................................... 165/9 |
| 3,602,602 | 8/1971 | Motta . |
| 4,306,838 | 12/1981 | Trainer . |
| 4,339,874 | 7/1982 | Mc'Carty et al. . |
| 4,359,912 * | 11/1982 | Small ..................... 74/572 |
| 4,377,370 | 3/1983 | Porcelli . |
| 4,730,154 | 3/1988 | Pinson . |
| 4,735,382 | 4/1988 | Pinson . |
| 4,926,107 | 5/1990 | Pinson . |
| 5,012,216 | 4/1991 | Jin . |
| 5,124,605 * | 6/1992 | Bitterly et al. .......................... 310/74 |
| 5,126,317 | 6/1992 | Agarwala . |
| 5,159,219 | 10/1992 | Chu et al. . |
| 5,163,809 | 11/1992 | Akgun et al. . |
| 5,209,461 * | 5/1993 | Whightsil .............................. 267/155 |
| 5,247,853 * | 9/1993 | Dalebout ........................ 74/583 R X |
| 5,387,451 | 2/1995 | Miller . |
| 5,437,538 | 8/1995 | Mitchell . |
| 5,513,498 | 5/1996 | Ackermann et al. . |
| 5,551,318 * | 9/1996 | Fukushima .............................. 74/574 |
| 5,563,565 | 10/1996 | Hull . |
| 5,692,414 * | 12/1997 | Gregoire ................................. 74/572 |
| 5,784,926 * | 7/1998 | Maas ...................................... 74/572 |

* cited by examiner

Primary Examiner—Vinh T. Luong
(74) Attorney, Agent, or Firm—Christensen O'Connor Johnson Kindness PLLC

(57) ABSTRACT

A containment vessel (10) or retaining projected high energy material fragments produced during the catastrophic failure of a high energy rotary mechanism, such as a composite flywheel (20), includes a continuous outer ring (30) and a plurality of inner shaped elements (40) that produce an inner ring layer. The outer ring (30) is approximately circular in shape and is designed to be unyielding during a flywheel failure. The inner shaped elements (40) are juxtapositioned axially along the inner periphery of the outer ring (30) and are configured and positioned to produce hollow cells (60). These shaped inner elements (40) are adapted of a material and are configured and positioned in such a way as to possess sufficient ductility so that the elements adequately flatten through non-destructive plastic deformation and contain the high energy material fragments (50) of a failed flywheel (20). The hollow cells (60) formed by the configuration and positioning of the shaped elements (40), plastically deform (or bend) at a rate fast enough to absorb the high level of energy from the impact over a significantly extended time interval and thus prevent the shaped elements (40) from experiencing ultimate tensile failure (rupture) or localized compression failure (buckling).

21 Claims, 3 Drawing Sheets

CONTAINMENT RING FOR FLYWHEEL FAILURE

FIELD OF THE INVENTION

The present invention relates to flywheel containment systems, and more particularly to light-weight, low cost containment systems designed to accommodate high-energy composite flywheel failures.

BACKGROUND OF THE INVENTION

The principle of flywheel energy storage is that a spinning wheel stores mechanical energy, energy that can be put in or taken out of the spinning wheel with the use of a motor or generator. The amount of energy stored in a flywheel depends on the mass of the rotor, the configuration of the rotor, and how fast the rotor is spinning. Specifically, the energy storage varies as a function of the rotational moment of inertia of the rotor and the square of the rotational speed of the rotor.

Flywheel energy storage depends on mechanical parts rotating in a precise relationship to electrical and other mechanical components. A major problem in these systems is the safety of the people and the property in the local area during the catastrophic failure of the rotating system. Historically, flywheels have been made of steel for the purpose of smoothing the flow of energy in the rotating machines. Steel flywheels, when stressed to failure by overspeed, will fracture into several large pieces. The inertial forces on the failed parts cause the parts to move radially outward away from the machine, at speeds proportional to the rotating speed of the flywheel before failure. This expulsion of energy can be extremely dangerous and destructive.

A new generation of flywheels is now being produced from composite materials (fiber and plastic) to take advantage of the composite material's inherent strengths which are much greater than steel. As a result, composite flywheels fail at much higher energy levels in quite a different manner than their steel counterparts. Instead of fracturing into pie-shaped pieces in the manner of steel flywheels, composite material flywheels fail such that a composite ring of circumferentially wrapped fibers extend as if the fibers were a viscous liquid. Although some fiber breakage occurs to initiate the expansion, the spinning mass of fibers remains grossly intact, while the plastic that binds the fibers together experiences complete failure.

Containment vessels for this type of composite material in failure have taken the form of very strong, rigid vessels. The practicality of making rigid vessels in large scale production is low and the space required for installation is prohibitive. These types of thick, rigid containment vessels have other disadvantages as well. First, containment vessels of this nature tend to be extremely heavy, and as such, are expensive and difficult to handle. Additionally, they cause the failed flywheel material fragments to divert their energy in the axial direction, since the rigid wall stops fragment expansion in the radial direction. Thus, this requires that containment vessels of this design utilize very heavy top and bottom end caps at the axial ends of the vessel, in order to contain diverted flywheel material fragments.

Another approach to safety in rotating materials, such as flywheels, is to overdesign and control the quality of the systems to the point that failure is exceedingly unlikely. This design philosophy is utilized in jet engine construction. Ideally, from a purely safety standpoint, this is the most desirable construction approach. However, if flywheels are to be widely utilized in diverse engineering applications, they cannot be as expensive to produce as jet engines.

Due to their superior strength qualities, flywheels constructed of composite materials may fail at speeds four to five times higher than that which was achievable using traditional steel flywheels. Thus, there is a continuing need for a relatively low cost, lightweight flywheel vessel that can contain flywheels that operate at energy levels on the order of twenty-five times higher than that produced by steel flywheels. Prior art physical mechanisms that have relied primarily on friction, local buckling, and pure tensile loading, have not proved to be sufficient since they cannot withstand the strain rate produced by the high speed event of the above-described type of failure. The material and configuration utilized in these types of prior art containment systems have not been able to change shape fast enough to avoid ultimate failure of the material.

SUMMARY OF THE INVENTION

The present invention discloses a containment device for retaining projected high energy material fragments that are produced during the catastrophic failure of a high energy rotary mechanism, such as aa composite flywheel. The containment device contains an approximately circular-shaped outer ring that is designed to be unyielding and not to experience direct contact with flywheel material fragments during a flywheel failure. Positioned axially along the inner periphery of the outer ring are a plurality of juxtapositioned, shaped elements that are configured and positioned to produce hollow cells. These shaped elements are adapted of a material and are configured and positioned in such a way as to possess sufficient ductility to adequately flatten through non-destructive plastic deformation and contain the high energy material fragments of a failed flywheel. The hollow cells formed by the shaped elements plastically deform (or bend) at a rate fast enough to prevent the elements from experiencing ultimate tensile failure (rupture) or localized compression failure (buckling). The shaped elements attach to the interior of the outer ring in a manner that forms an inner ring layer.

In a preferred embodiment of the present invention, the outer ring and shaped inner elements have an axial height that is greater than that of the flywheel itself. The shaped inner elements have midsections that are designed to plastically deform in the radially outward direction in response to impact from failed flywheel fragments in a manner that creates a concave interior surface. This concave surface then acts to prevent axial dispersion of diverted flywheel material fragments. The plastic deformation of the shaped inner elements occurs quickly enough to significantly extend the total impact time interval and thus reduce the peak force that must be absorbed by the elements. Therefore, the strength and thickness (and correspondingly, the weight and cost) of the material required to prevent ultimate failure of the shaped elements are dramatically reduced.

In one embodiment of the present invention, the inner elements are each formed in an S-shaped configuration. The two bends which form the S-shape of each inner element are oriented in the axial direction. These elements are juxtapositioned along the inner periphery of the outer ring in an overlapping arrangement to form an inner ring layer. In this design, one region of each S-shaped element contacts the inner wall of the outer ring and another region of each S-shaped element contacts an adjacent S-shaped element.

In an alternate embodiment, the shaped inner elements are similarly configured, but each contains more than two bends to form a more complex shape. This embodiment is capable of absorbing higher energy levels than the first described embodiment, but is more expensive to produce due to the increased forming requirements. Still another alternate embodiment utilizes a single shaped inner element that contains a plurality of axially aligned bends and folds such that this single inner element is configured to form a similar shape to the combination of all of the S-shaped elements in the original embodiment.

A containment device constructed in accordance with the present invention can thus be produced that is lightweight for relatively low cost, which is capable of containing composite flywheels during catastrophic failure, and that operates at energy levels on the order of twenty-five times higher than that produced by steel flywheels. The use of a containment system design that is based upon plastic deformation and high energy absorbing, hollow cell configurations, allows containment of high energy flywheel fragments to be achievable, that was not possible using prior art containment systems designed for metal rotor flywheels.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying wherein.

DETAILED DESCRIPTION OF THE PREFERRED EMBODIMENT

Figure 1:
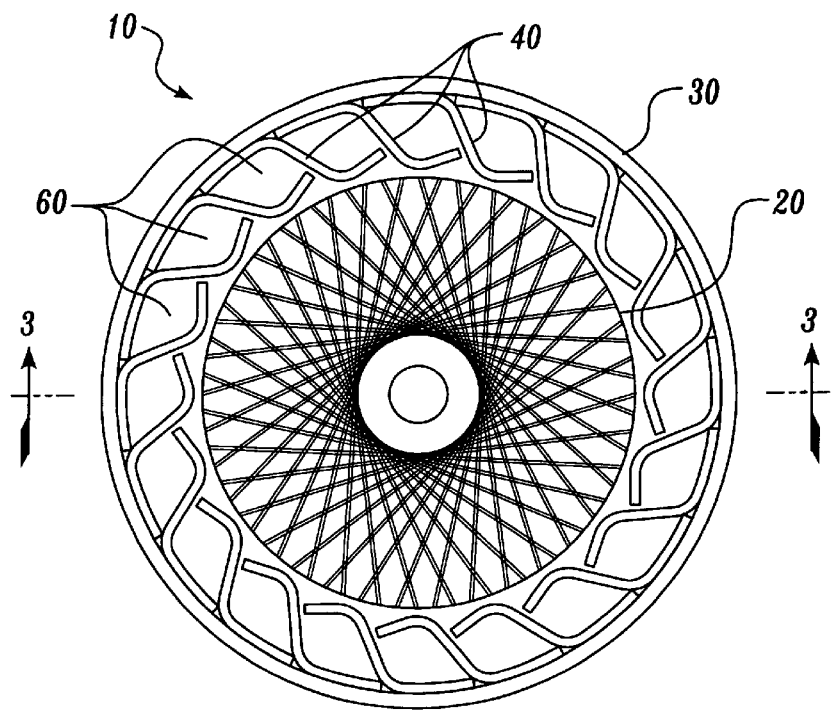
FIG. 1 illustrates a top view of a containment ring of the present invention that utilizes a plurality of S-shaped inner component elements, with a flywheel mounted inside the containment ring.

FIG. 1 illustrates a preferred embodiment of a containment vessel 10 constructed in accordance with the present invention, for retaining projected high energy material fragments produced during the catastrophic failure of a high energy rotary mechanism, such as a composite flywheel 20. The containment vessel 10 includes a continuous outer ring 30 and a plurality of inner shaped elements 40 that produce an inner ring layer. The outer ring 30 is preferably circular in shape and is designed to be unyielding during a flywheel failure and separated from the flywheel 20 by the inner shaped elements 40, such that the outer ring 30 does not experience direct contact with flywheel material fragments 50 (see FIG. 3B) during a flywheel failure. The inner-shaped elements 40 are juxtapositioned axially along the inner periphery of the outer ring 30 and are configured and positioned to produce hollow cells 60. These shaped inner elements 40 are adapted of a material, configured and positioned in such a way as to possess sufficient ductility to adequately flatten through non-destructive plastic deformation and contain the high energy material fragments 50 of a failed flywheel 20. The shaped elements 40, which are configured and positioned to form hollow cells 60, plastically deform (or bend) at a rate fast enough to absorb the high level of energy from the impact over a significantly extended time interval and thus prevent the shaped elements 40 from experiencing ultimate tensile failure (rupture) or localized compression failure (buckling).

Figure 2:
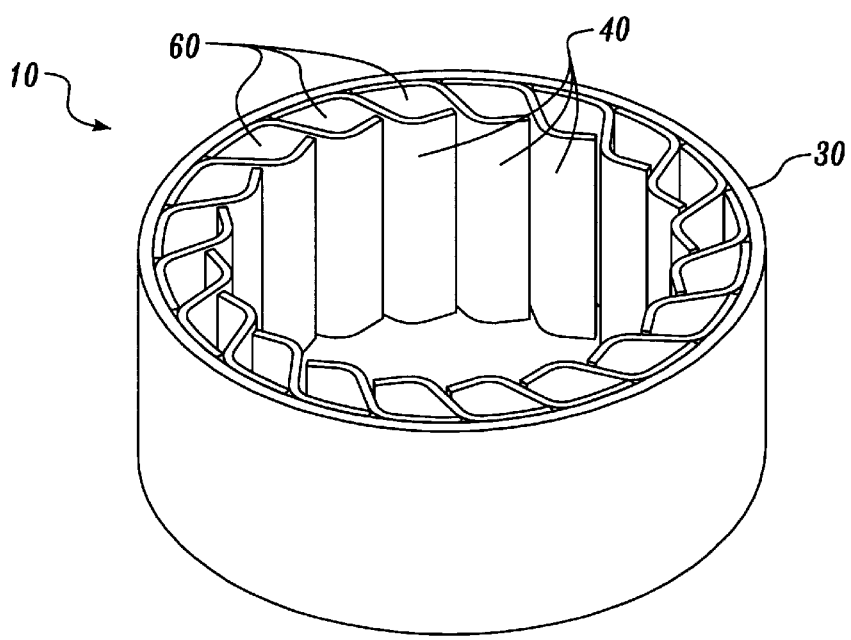
FIG. 2 illustrates an elevated perspective view of the embodiment of the present invention shown in FIG. 1.

As shown in FIGS. 1 and 2, the outer ring 30 is preferably configured to be preferably circular in shape. However, the outer ring 30 is essentially only a backup ring, and as such, the exact shape of the outer ring 30 is not critical to the utility of this invention. As will be discussed in further detail below, the axial height of the outer ring 30 is greater than the axial height of the flywheel 20 or other rotary element to be contained. The outer ring 30 is adapted of a material and is sized and shaped to maintain a loading that will not allow the outer ring 30 to yield during an impact from a flywheel 20 failure. Further, the outer ring 30 provides an inner surface to which the inner-shaped elements 40 are secured.

In a preferred embodiment of the present invention, as illustrated in FIGS. 1 and 2, the individual inner elements 40 are each formed in an S-like shape. These S-shaped elements 40 are composed of a material that is capable of substantial plastic deformation, such as plain carbon steel. A wide variety of materials can be used; however, it is preferable to use a material such as carbon steel which is low cost, easy to manufacture, and possesses a satisfactory level of ductility, i.e., the ability of a material to undergo plastic deformation without fracture. The individual S-shaped elements 40 can be manufactured for very low cost by press forming rectangular steel plates into the form of an S.

The inner S-shaped elements 40 are arranged axially along the inner periphery of the outer ring 30, in an overlapping configuration. As shown in FIGS. 1 and 2, one region of each S-shaped element 40 is secured, preferably by welding, to the inner surface of the outer ring 30. The end of each S-shaped element 40, opposite the end adjacent the secured region, contacts or approaches an adjacent S-shaped element 40. This configuration of the plurality of inner S-shaped elements 40 produces largely enclosed areas that can be described as hollow cells 60. These hollow cells 60 can be of a wide variety of shapes and sizes, and may or may not have a closed circumference. The S-shaped elements 40 are configured to form hollow cells 60 of a shape that requires large amounts of energy to flatten through carefully controlled plastic deformation (pure bending).

The plastic deformation of the S-shaped elements 40 resulting from the impact of the failed flywheel material fragments 50 occurs quickly enough to significantly extend the total impact time interval. Lengthening the time period of the impact reduces the peak energy level that must be absorbed by the elements 40 since the impact energy is dissipated and absorbed over a longer impact period. Thus, the strength required to prevent ultimate failure of the inner elements 40 of the containment vessel 10 is substantially reduced. Correspondingly, the weight and costs of the overall containment vessel 10 are reduced in turn as well.

As can be determined from FIGS. 1 and 2, each individual hollow cell 60 and its component S-shaped elements 40 cannot be flattened (through plastic deformation) without at least partially flattening an adjacent hollow cell 60. The flattening of this adjacent hollow cell 60 in turn results in at least the partial flattening of the next adjacent hollow cell 60. In this manner, a chain reaction is produced that substantially increases the amount of energy required to flatten these inner S-shaped elements 40 which act as an energy absorber during the catastrophic failure of a flywheel 20.

The unique configuration described above and shown in FIGS. 1 and 2 allows the individual S-shaped elements 40 to bend (plastically deform) without buckling (compression failure). Containment vessel configurations that appear similar but which primarily rely on buckling, rupture (tensile failure), shear loading, and/or friction to absorb energy from the failure of a rotary mechanism are incapable of dealing with the high levels of energy produced by the catastrophic failure of a high energy composite flywheel. It should be noted that some small level of friction and shear loading is always going to occur in a containment vessel during a flywheel failure, but this is not the primary mechanism through which this invention functions.

Figure 3A:
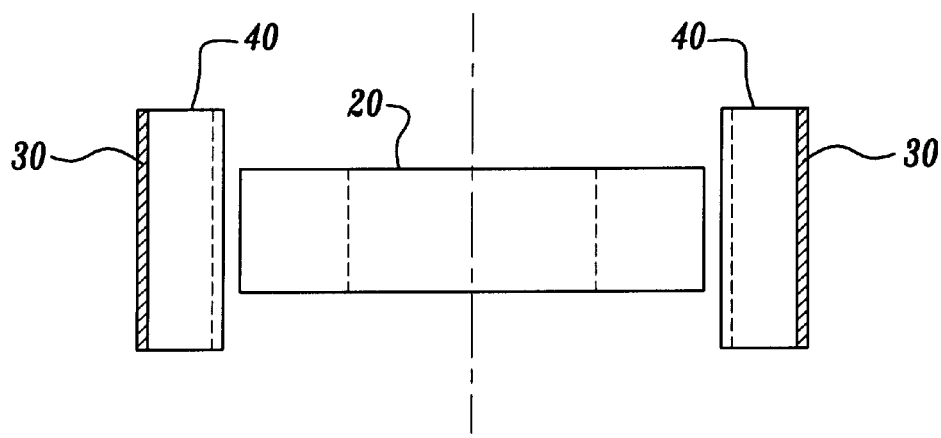
FIG. 3A illustrates a cross-sectional view of the present invention and flywheel as shown in FIG. 2, before flywheel failure.
Figure 3B:
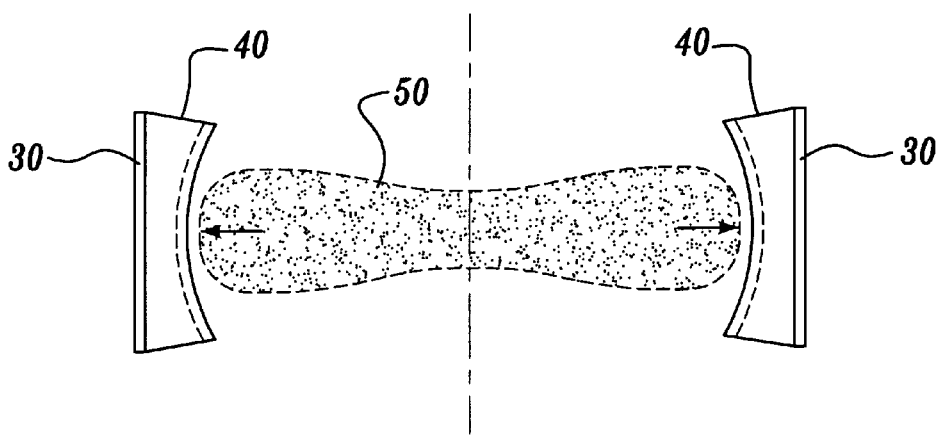
FIG. 3b illustrates a cross-sectional view of the present invention and flywheel as shown in FIG. 2, during flywheel failure, demonstrating plastic deformation of the energy absorbing S-shaped elements.

Referring now to FIGS. 3A and 3B, in a preferred embodiment of the present invention, the inner S-shaped elements 40, as well as the outer ring 30, have an axial height that is greater than that of the flywheel 20. In this configuration, the midsections of the inner S-shaped elements 40 plastically deform in a radially outward direction in response to impact from failed flywheel material fragments 50 in a manner that creates a concave interior surface. The formation of this concave surface, as shown in FIG. 3B, acts to contain the failed flywheel material fragments 50 instead of redirecting these fragments 50 in an axial direction. Since no flywheel fragments 50 are diverted axially during the impact event, there is no need for the containment vessel 10 to utilize a heavy top or bottom end cap. The lack of a heavy end cap requirement results in substantial weight and cost savings to the production of a containment vessel 10.

Figure 4:
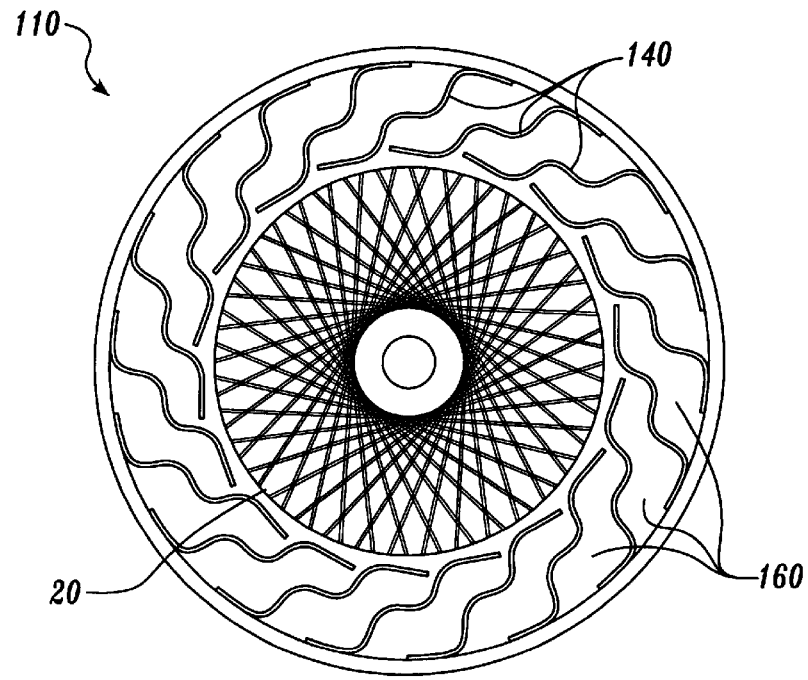
FIG. 4 illustrates a top view of an alternate embodiment containment ring of the present invention that utilizes a plurality of inner component elements having multiple bends, with a flywheel mounted inside the containment ring.

FIG. 4 illustrates an alternate embodiment of a containment vessel 110 constructed in accordance with the present invention. The containment vessel 110 is similar to the containment vessel 10, and as such only the differences between these embodiments are described below in detail, with remaining features understood to be constructed and operate similarly. The plurality of inner-shaped elements 140 of the alternate containment vessel 110 each contain four axially oriented bends, forming a more complex shape. These higher complexity, inner-shaped elements 140 are of a configuration that is similar to two S-shaped elements 40 connected end to end. This alternate containment ring 110 is capable of absorbing higher levels of energy than the previous embodiment because the more complex shape of the inner elements 140 requires a larger amount of energy to flatten (through plastic deformation). Further increasing the complexity of the inner-shaped elements 140 (i.e., more or differently shaped bends) and the hollow cells 160 that they produce will thus continue to increase the amount of energy that can be absorbed during an impact period. The counter balancing factor is that these more complex shapes are more expensive to produce due to the increased forming requirements. Thus, production costs must be weighed against the energy levels that must be accommodated and thus the required complexity level of the inner-shaped elements.

Figure 5:
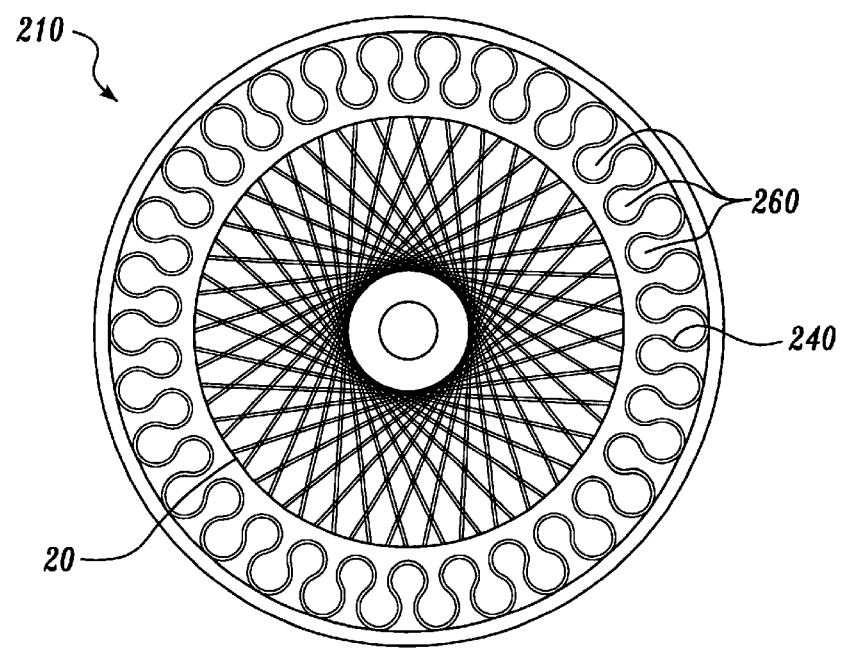
FIG. 5 illustrates a top view of another alternate embodiment containment ring of the present invention that utilizes a single shaped inner component element that has a plurality of bends and folds, with a flywheel mounted inside the containment ring.

FIG. 5 illustrates another alternate containment vessel 210 constructed in accordance with the present invention. The containient vessel 210 also is similar to the containment vessel 10; thus, only the differences between these embodiments are described below in detail, with remaining features understood to be constructed and to operate similarly. The containment vessel 210 utilizes a single shaped inner element 240 that contains a plurality of axially aligned bends such that this single inner element 240 is configured to form a somewhat similar shape to the combination of all of the S-shaped elements 40 of the containment vessel 10. Thus, this alternate containment vessel 210 also includes a plurality of hollow cells 260 that are produced by the plurality of bends in the single inner element 240. In this particular embodiment, the hollow cells 260 are configured in bulbous, quasi-circular formations. These hollow cells 260 act as energy absorbers and flatten through plastic deformation.

Other embodiments of this invention utilizing a single shaped inner element 240 could employ differently shaped bends. In one possible exemplary embodiment, the bends in the element 240 could be so extreme as to cause sections of the element 240 to fold back in contact with itself and take a form even more similar in shape to the combination of all of the individual S-shaped elements 40 of the containment vessel 10. As with the previous embodiments, the utility of this inner element configuration and material composition is derived from the reliance of the containment vessel 210 on plastic deformation to absorb the energy of failed flywheel material fragments 50 during the impact following the catastrophic failure of the flywheel.

The present invention has been described in relation to a preferred embodiment and several alternate embodiments. One of ordinary skill, after reading the foregoing specification, may be able to affect various other changes, alterations, and substitutions or equivalents without departing from the concepts disclosed. It is therefore intended that the scope of the letters patent granted hereon be limited only by the definitions contained in the appended claims and equivalents thereof.

The embodiments of the invention in which an exclusive property or privilege is claimed are defined as follows:

1. A containment device for use in retaining material fragments produced by an energy storage flywheel during failure by absorbing the energy contained in said material fragments, the containment device comprising:

an outer ring for receiving an energy storage flywheel therein and having said inner surface; and a plurality of juxtapositioned shaped elements welded to the inner surface of the outer ring to form an inner ring layer, said shaped elements configured and positioned to define hollow cells arranged axially along the inner surface of the outer ring, said elements being constructed and arranged for directly and independently receiving material fragments produced by said failed energy storage flywheel received in said outer ring, said shaped elements being formed of a plastically deformable material and configured and positioned so that the shaped elements are directly and independently flattened through non-destructive plastic deformation by material fragments produced by said failed energy storage flywheel to absorb the energy contained in said material fragments while preventing said shaped elements from experiencing ultimate tensile failure or localized compression failure.

2. The containment device of claim 1, wherein the shaped elements are composed of carbon steel.

3. The containment device of claim 1, wherein the shaped elements are composed of stainless steel.

4. The containment device of claim 1, wherein the outer ring and shaped elements have an axial height greater than that of the energy flywheel.

5. The containment device of claim 1, wherein the shaped elements have plastically deformable midsections that are designed to deform radially outward in response to impacts of material fragments produced by said failed energy storage flywheel, to form a concave surface configured to prevent axial dispersion of material fragments produced by said failed energy storage flywheel.

6. The containment device of claim 1, wherein the shaped elements are configured to be capable of a plastically deforming fast enough to act as energy absorbers, reducing the peak force on the containment device by extending the energy absorption period and preventing ultimate failure of the shaped elements from occurring.

7. The containment device of claim 1, wherein the outer ring is sized and constructed to be unyielding during the failure of said energy storage flywheel.

8. The containment device of claim 1, wherein the individual shaped elements are formed from steel plates that are pressed into a shaped configuration.

9. A containment device for use in retaining material fragments produced by an energy storage flywheel during failure by absorbing the energy contained in said material fragments, the containment device comprising;
    an outer ring for receiving an energy storage flywheel and having said inner surface; and
    a plurality of juxtapositioned shaped elements containing multiple bends, arranged axially along and welded to the inner surface of the outer ring to form an inner ring layer, said shaped elements containing multiple bends and being comprised of a plastically deformable matrial, said shaped elements being configured and positioned so that the shaped elements are directly and independently flattened through non-destructive plastic deformation by said material fragments from said failed energy storage flywheel, thereby absorbing the energy contained in said material fragments while preventing said shaped elements from experiencing ultimate tensile failure or localized compression failure.

10. The containment device of claim 9 wherein the shaped elements are configured to contain more than two bends in the axial direction.

11. The containment device of claim 9 wherein the shaped elements are composed of carbon steel.

12. The containment device of claim 9 wherein the shaped elements are composed of stainless steel.

13. The containment device of claim 9, wherein the outer ring and shaped elements have an axial height greater than that of the energy storage flywheel.

14. The containment device of claim 9, wherein the shaped elements have plastically deformable midsections that are designed to deform radially outward in response to impacts of material fragments produced by said failed energy storage flywheel, to form a concave surface configured to prevent axial dispersion of material fragments produced by said failed energy storage flywheel.

15. The containment device of claim 9, wherein the shaped elements are configured to be capable of plasticlaly deforming fast enough to act as energy absorbers, reducing the peak force on the containment device by extending the energy absorption period and preventing ultimate failure of the shaped elements from occurring.

16. The containment device of claim 9, wherein the outer ring is sized and constructed to be unyielding during the failure of said energy storage flywheel.

17. The containment device of claim 9, wherein the individual shaped elements are formed from steel plates that are pressed into a shaped configuration containing more than two bends.

18. A containment device for use in retaining material fragments produced by an energy storage flywheel during failure by absorbing the energy contained in said material fragments, the containment device comprising:
    an outer ring for receiving said energy storage flywheel therein and having an inner surface; and
    a plurality of overlapping S-shaped elements arranged axially along the inner surface of the outer ring, said plurality of overlapping S-shaped elements comprised of a plastically deformable material and configured and positioned so that the S-shaped elements are directly and independently flattened through non-destructive plastic deformation in the radially outward direction by material fragments from said failed energy storage flywheel, thereby absorbing the energy contained in said material fragments while preventing said S-shaped elements from experiencing ultimate tensile failure or localied compression failure, and wherein the S-shaped elements are juxtapositioned in an overlapping configuration along the inner surface of the outer ring to form an inner ring layer, such that one region of each S-shaped element contacts the inner surface of the outer ring and another region of each S-shaped element contacts or approaches an adjacent S-shaped element.

19. The containment device of claim 18, including said energy storage flywheel mounted in the outer ring, wherein the outer ring and S-shaped elements have an axial height greater than that of the energy storage flywheel.

20. The containment device of claim 18, wherein the S-shaped elements have plastically deformable midsections that are designed to deform radially outward in response to impacts of material fragments produced by said failed energy storage flywheel, to form a concave surface configured to prevent axial dispersion of material fragments produced by said failed energy storage flywheel.

21. The containment device of claim 18, wherein the S-shaped elements are configured to be capable of plastically deforming fast enough to act as energy absorbers, reducing the peak force on the containment device by extending the energy absorption period and preventing ultimate failure of the S-shaped elements from occurring.

* * * * *

UNITED STATES PATENT AND TRADEMARK OFFICE
CERTIFICATE OF CORRECTION

PATENT NO.    : 6,182,531 B1
DATED         : February 6, 2001
INVENTOR(S)   : P. Gallagher et al.

It is certified that error appears in the above-identified patent and that said Letters Patent is hereby corrected as shown below:

Column 2,
Item [57], Abstract , "(10) or" should read -- (10), for --

Column 6,
Line 67 (claim 4, line 3), "energy flywheel." should read -- energy storage flywheel. --

Column 7,
Line 2 (claim 5, line 2), "defomable" should read -- deformable --
Line 3 (claim 5, line 3), "outward" should read -- outward, --
Line 4 (claim 5, line 4), "said failed" should read -- a failed --
Lines 6-7 (claim 5, lines 6-7), "said failed" should read -- a failed --
Line 9 (claim 6, line 2), "a plastically" should read -- plastically --
Line 15 (claim 7, line 2), "during the" should read -- during --
Line 16, "said energy storage flywheel." should read -- "said energy storage flywheel received therein. --
Line 23 (claim 9, line 4), "comprising;" should read -- comprising: --
Line 31 (claim 9, line 12), "matrial" should read -- material --
Line 46 (claim 13, line 1), "9, wherein" should read -- 9, including said energy storage flywheel mounted in the outer ring, wherein --

Column 8,
Line 2 (claim 15, line 2), "plasticlaly" should read -- plastically --
Line 31 (claim 18, line 18), "localied" should read -- localized --

Signed and Sealed this

Thirtieth Day of October, 2001

*Attest:*

NICHOLAS P. GODICI
*Attesting Officer*   *Acting Director of the United States Patent and Trademark Office*